United States Patent Office 3,546,252
Patented Dec. 8, 1970

3,546,252
DIMETHYL OXA-STEROIDS
Milan Radoje Uskokovic, Upper Montclair, N.J., assignor to Hoffmann-La Roche, Inc., Nutley, N.J., a corporation of New Jersey
No Drawing. Continuation-in-part of application Ser. No. 680,308, Nov. 3, 1967. This application Oct. 31, 1968, Ser. No. 772,385
Int. Cl. C07d 7/06
U.S. Cl. 260—343.2                    10 Claims

ABSTRACT OF THE DISCLOSURE

Various preparative routes to the 6-substituted or unsubstituted-17,17-dimethyl - 4 - oxa-18-norandrost-13-en-3-ones are described. The end products are useful as antiandrogens.

RELATED APPLICATIONS

This application is a continuation-in-part of Ser. No. 680,308 filed Nov. 3, 1967, now abandoned.

DESCRIPTION OF THE INVENTION

This invention relates to compounds of the formula

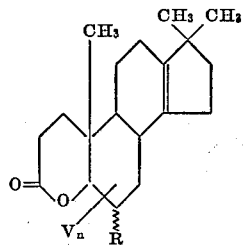

I where R is hydrogen or halogen, V is an unsaturation between the 5 and 6 position and $n$ is an integer from 0 to 1.

A particularly preferred embodiment of the present invention involves compounds of the above formula wherein $n$ is 0, i.e., compounds of the following formula:

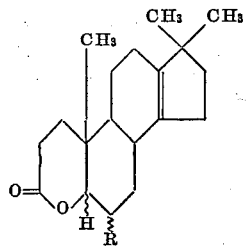

II where R is as above.

In a preferred embodiment of compounds of Formula II, R is hydrogen or halogen, preferably bromo. In a preferred embodiment the hydrogen attached to the 5-position has the α configuration. Representative compounds corresponding to Formula II include the following:

17,17-dimethyl-4-oxa-18-norandrost-13-en-3-one;
6α-bromo-17,17-dimethyl-4-oxa-18-norandrost-13-en-3-one;
6β-bromo-17,17-dimethyl-4-oxa-18-norandrost-13-en-3-one.

Compounds of Formula II are readily prepared by means of alternative process routes. In one embodiment of the present invention compounds of Formula II are prepared in a two-step process sequence starting with compounds of the following formula:

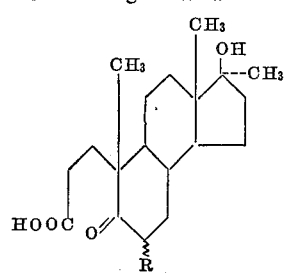

III where R is as above.

The initial step in this procedure involves rearrangement of the compound of Formula III to a compound of Formula IV utilizing an acid catalyst.

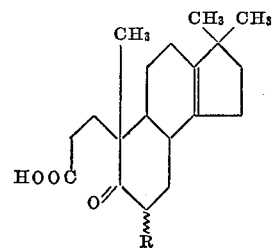

IV where R is as above.

Suitable acid catalysts for use in the above rearrangement reaction include the mineral acids, e.g., hydrochloric acid, hydrobromic acid, sulfuric acid, phosphoric acid, etc., as well as Lewis acid type catalysts such as, for example, zinc chloride, boron trifluoride, etc. It is also possible to utilize strong organic acids as catalyst for this reaction such as, for example, trichloroacetic acid. Solvents useful in the rearrangement reaction include aromatic hydrocarbons such as benzene, lower alkanols such as ethanol or methanol, ethers such as ethyl ether, acetonitrile, and organic acids such as acetic acid. A particularly preferred solvent for the rearrangement reaction is acetonitrile. Reaction conditions include a temperature in the range of from about room temperature to the reflux temperature of the reaction medium. It is generally preferred that anhydrous conditions be employed during this reaction.

When R is halogen in the Formula III above, it is particularly desirable that a hydrohalic acid be employed wherein the halogen entity of the acid is the same as substituent R. Thus, for example, if R is bromine, hydrogen bromide becomes the acid of choice.

Compounds of Formula IV are then converted in a further step to compounds of Formula II by first treating the former compounds with an alkali metal borohydride such as sodium or lithium borohydride to reduce the 5-oxo moiety to a 5-hydroxy moiety. The treatment with alkali metal borohydride can be effected, for example, below room temperature, at a temperature from the freezing temperature of the solvent to room temperature (suitably in an ice bath), preferably in an inert solvent. Suitable solvents include lower alkanols such as methanol, ethanol or isopropanol, tetrahydrofuran, dioxane, dimethylformamide and the like.

Following the reduction, acidification effects cyclization, i.e., lactonization. This lactonization can be effected using organic acids such as acetic acid or mineral acids such as hydrochloric acid. The acid can be directly added to the cooled reaction mixture subsequent to the alkali metal borohydride reduction or the 5-hydroxy compounds can be isolated and then acidified to effect lactonization, which can conveniently be accomplished at or below room temperature, i.e., from the freezing point of the solvent system to room temperature.

Compounds of Formula II may also be prepared directly by the rearrangement of compounds of the following formula:

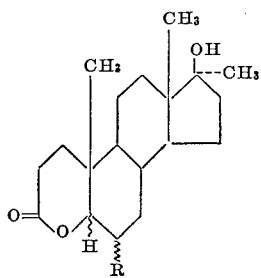

V where R is as above.

The rearrangement of compounds of Formula V proceeds in the same manner as previously described for the rearrangement of compounds of Formula III.

Another aspect of the present invention relates to compounds of Formula I wherein $n$ is 1, i.e., compounds of the following formula:

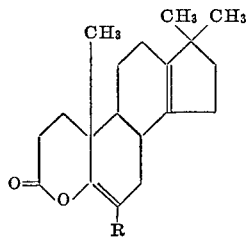

VI where R is as above.

Compounds of Formula VI are readily obtainable by rearrangement of compounds of the following formula by employing acidic catalysts in the manner described previously.

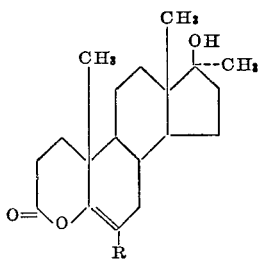

VII where R is as above.

In effecting the rearrangement of compounds of Formula VI to compounds of Formula VII it is preferred that the solvent employed be a non-polar solvent such as, for example, an aromatic hydrocarbon solvent such as benzene, an ether such as dioxane, tetrahydrofuran or ethyl ether, or acetonitrile. The solvent of preference for this rearrangement is acetonitrile.

In an alternative procedure, compounds of Formula VI are prepared from compounds of Formula IV by employing conventional dehydration conditions such as, for example, the use of acetic anhydride and sodium acetate.

The several reactions described above for preparing the specific embodiments of compounds of Formula I, i.e., compounds of Formulae II and VI, are summarized in the following reaction scheme wherein the meaning of R is as above throughout.

REACTION SCHEME

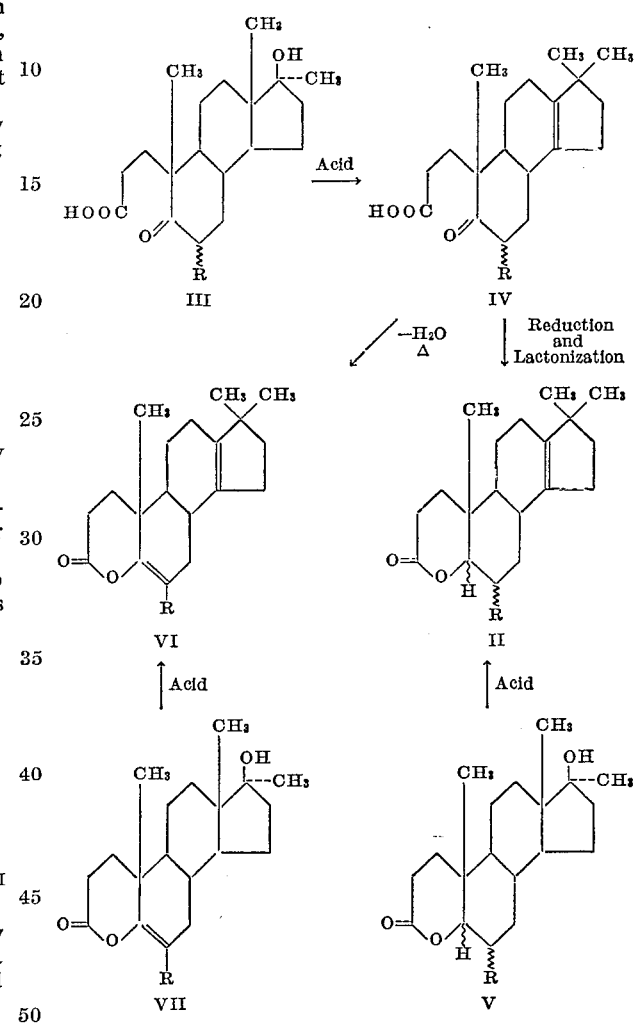

It should be noted that the rearrangement reactions of compounds of Formulae V and VII can conveniently be summarized with respect to the general Formula I representation as follows:

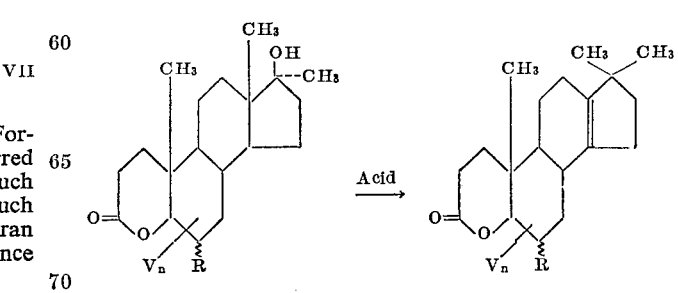

VIIII (representing V and VIII)

where R, V and $n$ are as above.

The compounds of Formula I (and thus thereby including compounds of Formula II and Formula VI) are useful as anti-androgens. The anti-androgenic activity may be shown, for example, by administering to each of five castrate male rats, weighing approximately 40–50 grams, concurrent injections of the compound in sesame oil at 5 mg./0.2 ml./rat/day, and testosterone proprionate at 0.1 mg./0.2 ml./rat/day by separate injection. A control group of five rats should receive the testosterone propionate alone. After seven days of treatment all animals are autopsied and weights of their seminal vesicles and prostrates are determined. Inhibition of the effect of testosterone propionate on the target organs shows activity. Besides inhibition of androgenic response to testosterone propionate, antiandrogenic effect can also be shown by measuring response inhibition to other androgens such as testosterone, fluoxymesterone or the like.

The endocrinologically useful compounds of this invention can be administered topically or internally, for example, orally or parenterally. Dosage should be adjusted to individual needs. The active ingredient of Formula I, II or VI can be administered in conventional solid and liquid pharmaceutical dosage forms, such as capsules, tablets, suppositories, solutions, suspensions, creams or the like. They can contain conventional pharmaceutical additives such as stearyl alcohol, cetyl alcohol, petrolatum, polyalkalene glycols, water, carnauba wax, lactose, cornstarch, calcium stearate, talc or the like. They can be submitted to conventional pharmaceutical expedients such as sterilization or the like and can contain preservatives, emulsifying agents, agents for the adjustment of osmotic pressure and the like.

The following examples are illustrative but not limitative of the invention. All temperatures, unless otherwise stated, are in degrees centigrade. Compounds having a proton at an assymetric carbon atom at position-5 bear such proton in the 5α-stereo-configuration unless explicity denoted as having a 5β-stereo-configuration.

EXAMPLE 1

17,17 - dimethyl - 5 - oxo-3,5-seco-4,18-dinorandrost-13-en-3-oic acid from 17α-methyl-17β-hydroxy-5-oxo-3,5-seco-A-norandrostan-3-oic acid To a solution of 3.22 g. (0.01 mole) of 17α-methyl-17β-hydroxy-5-oxo-3,5 - seco-A-norandrostan-3-oic acid in 50 ml. of acetonitrile were added several drops of acetonitrile saturated with gaseous hydrogen bromide, and the reaction mixture stirred at 60° for 24 hours. After evaporation to dryness, the residue was taken in 500 ml. of ether. The ethereal solution was extracted with 4× 50 ml. of 2 N aqueous sodium sulfate. The carbonate extract was poured into ice-cold concentrated hydrochloric acid and extracted with 500 ml. of dichloromethane. The extract was washed with 50 ml. of water, dried over anhydrous sodium sulfate and evaporated to dryness. The residue, a brownish oil, was purified by column chromatography (silica gel column, elution with 50% ethyl acetate in benzene), to give 17,17-dimethyl-5-oxo-3,5-seco-4,18-dinorandrost-13-en-3-oic acid, as a glass.

EXAMPLE 2

17,17-dimethyl-4-oxa - 18 - norandrost-13-en-3-one from 17,17 - dimethyl - 5 - oxo-3,5-seco-4,18-dinorandrost-13-en-3-oic acid To a stirred solution of 0.1 g. (0.0046 mole) of lithium borohydride in 10 ml. of anhydrous tetrahydrofuran at −70° C., was added dropwise a solution of 0.6 g. (0.001926 mole) of 17,17-dimethyl-5-oxo-3,5-seco-4,18-diorandrost-13-en-3-oic acid in 50 ml. of tetrahydrofuran. The stirring at −70° C. was continued for 3 hours. After addition of 2 ml. of water and 2 ml. of concentrated hydrochloric acid, the reaction mixture was allowed to warm up to room temperature. It was then diluted with 1 l. of ether, washed with 2 N aqueous sodium carbonate (2× 50 ml.), and water, dried over anhydrous magnesium sulfate and evaporated. The residue was chromatographed on a 1.7 kg. silica gel column. The fractions eluted with benzene containing 6 percent ethyl acetate were combined and distilled in high vacuum to give 17,17-dimethyl-4-oxa-18-norandrost - 13-en-3-one; M.P. 71–74° $[\alpha]_D^{25}$ +41.5° (c. 1.0 in abs. EtOH).

EXAMPLE 3

17,17-dimethyl-4-oxa - 18 - norandrost-13-en-3-one from 17β-hydroxy-17α-methyl-4-oxa-androstan-3-one A mixture of 0.9195 g. (0.003 mole) of 17β-hydroxy-17α-methyl-4-oxa-androstan-3-one, 0.261 g. of lithium bromide, 10 ml. of acetonitrile and a few drops of acetonitrile saturated with hydrogen bromide was heated and stirred at 50° C. for 48 hours. The reaction mixture was then evaporated to dryness in vacuo. The residue was taken in 1 l. of ether, washed with water (25 ml.), 2 N aqueous sodium carbonate (25 ml.), and again with water (3× 25 ml.), then dried over anhydrous magnesium sulfate and evaporated to dryness. The crude product was purified by chromatography on a silica gel column and molecular distillation. 17,17-dimethyl-4-oxa-18-norandrost-13-en-3-one was obtained in the form of waxy crystals, M.P. 71–73°; $[\alpha]_D^{24.9}$+41.1° (c. 0.73 in abs. EtOH).

EXAMPLE 4

6α - bromo - 17,17 - dimethyl - 4 - oxa - 18 - norandrost-13-en-3-one from 6α-bromo-17β-hydroxy-17α-methyl-4-oxa-androstan-3-one A mixture of 1.155 g. (0.003 mole) of 6α-bromo-17β-hydroxy-17α-methyl-4-oxa-androstan-3-one, 0.261 g. of lithium bromide, 10 ml. of acetonitrile and few drops of acetonitrile saturated with hydrogen bromide was heated and stirred at 50° C. for 24 hours. The reaction mixture was then evaporated to dryness in vacuo. The residue was taken in 1 l. of ether, washed with 2 N aqueous sodium carbonate and water, dried over anhydrous magnesium sulfate and evaporated. The residue was crystallized from ether to give unreacted starting material. The remaining mother liquors were chromatographed on a silica gel column. The fractions eluted with benzene containing 10 percent ethyl acetate gave amorphous 6α-bromo-17,17-dimethyl-4-oxa-18-norandrost-13-en-3-one; $[\alpha]_D^{24.9}$ +108° (c. 1.345 in tetrahydrofuran).

EXAMPLE 5

6β - bromo - 17,17 - dimethyl - 4 - oxa - 18 - norandrost-13-en-3-one from 6β-bromo-17β-hydroxy-17α-methyl-4-oxa-androstan-3-one Utilizing the same procedure described in the preceding example 6β-bromo-17β-hydroxy-17α-methyl-4-oxa-androstan-3-one was converted to 6β-bromo-17,17-dimethyl-4-oxa-18-norandrost-13-en-3-one, M.P. 162.5–164°; $[\alpha]_D^{24.9}$ −34° (c. 1.28 in THF).

EXAMPLE 6

17,17-dimethyl-4-oxa-18-norandrost-13-en-3-one

Capsule formulation:                          Per capsule, mg.
  17,17 - dimethyl - 4 - oxa - 18 - norandrost-
    13-en-3-one _____ 100
  Lactose _____ 83
  Corn starch _____ 37
  Talc _____ 5
                                                ———
  Total weight _____ 225

*Procedure.*—(1) 17,17-dimethyl-4-oxa-18-nor-androst-13-en-3-one, lactose and cornstarch were mixed in a suitable mixer. (2) The mixture was further blended by passing through a Fitzpatrick Comminuting Machine with a No. 1A screen with knives forward. (3) The blended powder was returned to the mixer, the talc added and blended thoroughly. The mixture was then filled into No. 4 hard shell gelatin capsules on a Parke Davis capsulating machine.

Tablet formulation:

| | Per tablet, mg. |
|---|---|
| 17,17 - dimethyl - 4 - oxa - 18 - nor - androst-13-en-3-one | 100 |
| Lactose, U.S.P. | 202 |
| Cornstarch, U.S.P. | 37 |
| Amijel B011 [1] | 20 |
| Calcium stearate | 8 |
| Total weight | 410 |

[1] A prehydrolyzed food grade corn starch. Any similar prehydrolyzed corn starch may be used. Purchased from Corn Products Company, 10 E. 56th St., New York, N.Y.

*Procedure.*—(1) 17,17-dimethyl-4-oxa-18-nor-androst-13-en-3-one, lactose, corn starch, and Amijel B011 were blended in a suitable mixer. (2) The mixture was granulated to a heavy paste with water and the moist mass was passed through a No. 12 screen. It was then dried overnight at 110° F. (3) The dried granules were passed through a No. 16 screen and transferred to a suitable mixer. The calcium stearate was added and mixed until uniform. (4) The mixture was compressed at a tablet weight of 410 mg. using tablet punches having a diameter of approximately ⅜″. (Tablets may be either flat or biconvex and may be scored if desired.)

Suppository formulation:

| | Per 1.3 gm. suppository, gm. |
|---|---|
| 17,17 - dimethyl - 4 - oxa - 18 - nor - androst-13-en-3-one | 0.050 |
| Wecobee M [1] | 1.205 |
| Carnauba wax | 0.045 |

[1] E. F. Drew Company, 522 5th Ave., New York, N.Y.

*Procedure.*—(1) The Wecobee M and the carnauba wax were melted in a suitable size glass lined container (stainless steel may also be used), mixed well and cooled to 45° C. (2) 17,17-dimethyl-4-oxa-18-nor-androst-13-en-3-one, which had been reduced to a fine powder with no lumps, was added and stirred until completely and uniformly dispersed. (3) The mixture was poured into suppository molds to yield suppositories having an individual weight of 1.3 gms. (4) The suppositories were cooled and removed from molds. They were individually wrapped in wax paper for packaging. (Foil may also be used.)

0.1 percent cream:

| | Mg. per gram |
|---|---|
| 17,17-dimethyl-4-oxa-nor-androst-13-en-3-one | 50.00 |
| Stearyl alcohol | 100.00 |
| Cetyl alcohol | 15.00 |
| White petrolatum | 70.00 |
| Methyl parahydroxybenzoate, U.S.P. | 2.00 |
| Propyl parahydroxybenzoate, U.S.P. | 0.50 |
| Isopropyl palmitate | 60.00 |
| Polyoxyl 40 stearate, U.S.P. | 40.00 |
| Propylene glycol | 120.00 |
| Disodium versenate | 0.10 |
| Distilled water | 548.16 |

*Procedure.*—(1) The stearyl alcohol, cetyl alcohol, petrolatum, propyl parahydroxybenzoate, isopropyl palmitate and polyoxyl 40 stearate were melted at 75° C. The mixture was cooled to and maintained at 70° C. (2) Disodium versenate and methyl parahydroxybenzoate were dissolved in hot distilled water to which was added the propylene glycol. The solution was mixed at 75° C. and slowly added to the oil solution prepared previously, using slow agitation. The emulsion was gradually cooled with slow stirring. (3) When the temperature of the ointment reached 55° C., a solution of 17,17-dimethyl-4-oxa-18-nor-androst-13-en-3-one was added and mixed with ointment. (4) When the temperature of the ointment reached 50° C., cold water was circulated in the jacket of the kettle and the ointment was cooled to 30° C. with stirring. The ointment was then transferred to storage containers.

What is claimed is:

1. A compound of the formula

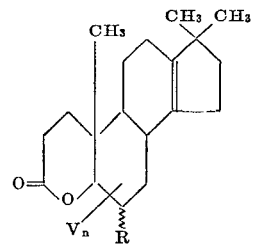

I where R is hydrogen or halogen, V is an unsaturation between the 5 and 6 position and $n$ is an integer from 0 to 1.

2. The compound of claim 1 wherein $n$ is 0, i.e., a compound of the following formula

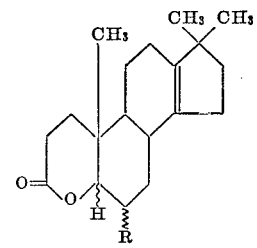

II where R is as above.

3. The compound of claim 2 wherein R is halogen.

4. 17,17-dimethyl-4-oxa-18-norandrost-13-en-3-one.

5. 6α - bromo-17,17-dimethyl-4-oxa-18-norandrost-13-en-3-one.

6. 6β - bromo-17,17-dimethyl-4-oxa-18-norandrost-13-en-3-one.

7. A compound of claim 1 wherein $n$ is one, i.e., a compound of the formula

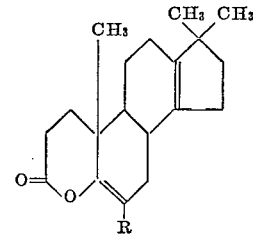

VI where R is as above.

8. A process for the preparation of compounds of the formula

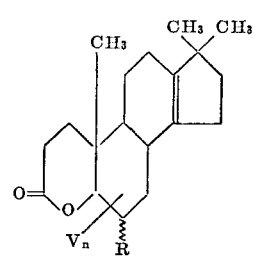

I where R is hydrogen or halogen, V is an unsaturation between the 5 and 6 position and $n$ is an integer from 0 to 1 which process comprises rearranging in the presence of acid a compound of the following formula

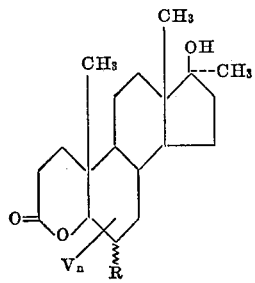

where R, V and $n$ are as above.

9. The process of claim 8 wherein $n$ is 0 and R is hydrogen.

10. The process of claim 8 wherein $n$ is 0 and R is halogen.

References Cited

UNITED STATES PATENTS

| | | | |
|---|---|---|---|
| 3,251,860 | 5/1966 | Pappo et al. | 260—343.2 |
| 3,329,688 | 7/1967 | Edwards et al. | 260—343.2 |

HENRY R. JILES, Primary Examiner

J. M. FORD, Assistant Examiner

U.S. Cl. X.R.

260—468, 514; 424—279